US006871014B2

(12) United States Patent
Pierre

(10) Patent No.: US 6,871,014 B2
(45) Date of Patent: Mar. 22, 2005

(54) WATER TREATMENT SYSTEM AND WATER HEATER WITH CATHODIC PROTECTION AND METHOD

(75) Inventor: Christian Pierre, Brussels (BE)

(73) Assignee: The Coca-Cola Company, Atlanta, GA (US)

(*) Notice: Subject to any disclaimer, the term of this patent is extended or adjusted under 35 U.S.C. 154(b) by 42 days.

(21) Appl. No.: 10/133,989

(22) Filed: Apr. 26, 2002

(65) Prior Publication Data

US 2003/0202786 A1 Oct. 30, 2003

(51) Int. Cl.[7] .............................................. F24H 1/20
(52) U.S. Cl. .................. 392/457; 204/196.05; 392/441
(58) Field of Search ................. 392/441–454, 392/457; 204/196.6, 196.03, 196.05

(56) References Cited

U.S. PATENT DOCUMENTS

| | | | | |
|---|---|---|---|---|
| 3,037,925 A | * | 6/1962 | Boncher et al. | 204/196.16 |
| 4,255,647 A | * | 3/1981 | Rickert et al. | 204/196.03 |
| 4,972,066 A | * | 11/1990 | Houle et al. | 204/196.05 |
| 5,057,198 A | * | 10/1991 | Bochkarev et al. | 205/750 |
| 5,192,432 A | | 3/1993 | Andelman | 210/198.2 |
| 5,196,115 A | | 3/1993 | Andelman | 210/198.2 |
| 5,200,068 A | | 4/1993 | Andelman | 210/198.2 |
| 5,360,540 A | | 11/1994 | Andelman | 210/198.2 |
| 5,415,768 A | | 5/1995 | Andelman | 210/198.2 |
| 5,538,611 A | | 7/1996 | Otowa | 204/550 |
| 5,547,581 A | | 8/1996 | Andelman | 210/656 |
| 5,587,055 A | | 12/1996 | Hartman et al. | 203/1 |
| 5,620,597 A | | 4/1997 | Andelman | 210/198.2 |
| 5,647,269 A | | 7/1997 | Miller et al. | 99/279 |
| 5,748,437 A | | 5/1998 | Andelman | 361/302 |
| 5,779,891 A | | 7/1998 | Andelman | 210/198 |

FOREIGN PATENT DOCUMENTS

| | | |
|---|---|---|
| DE | 31 05 922 A1 | 9/1982 |
| DE | 39 16 847 A1 | 11/1990 |
| DE | 40 08 329 C1 | 5/1991 |
| DE | 199 57 406 A1 | 5/2001 |
| EP | 0 337 455 | 10/1989 |
| GB | 2 238 532 A | 6/1991 |
| WO | WO 96/30309 | 10/1996 |
| WO | WO 00/25887 | 5/2000 |
| WO | WO 01/19734 A1 | 3/2001 |
| WO | WO 02/059394 | 8/2002 |

OTHER PUBLICATIONS

Sabrex of Texas, Inc., Electronic Water Purifier, 2 pages, found at www.sabrex–tx.com on Jun. 15, 2000.

(List continued on next page.)

*Primary Examiner*—Thor Campbell
(74) *Attorney, Agent, or Firm*—Sutherland Asbill & Brennan LLP

(57) ABSTRACT

A water heater comprising a housing defining a water heating chamber, at least a portion of the housing being metallic, and a metallic heating element disposed in the housing for heating the water, wherein the metallic portion of the housing and a metallic heating element are electrically connected such that the metallic portion of the housing is cathodic and the metallic heating element is anodic and current flows from the metallic heating element, through the water, to the metallic portion of the housing. A system for treating water is also disclosed and comprises the water heater and a collector disposed in the housing for collecting solid precipitates deposited from the water. Methods for heating and treated water are also disclosed.

23 Claims, 2 Drawing Sheets

OTHER PUBLICATIONS

Sabrex of Texas, Inc., Electronic Water Purifier, *Flow Schematic*, 1 page, found at www.sabrex-tx.com/brochure_back.htm on Jun. 15, 2000.

Sabrex of Texas, Inc., Electronic Water Purifier, *Create DI Water for Recycle from Waste Waters*, 1 page; found at www.sabrex-tx.com/brochure_front.htm on Jun. 15, 2000.

Sabrex of Texas, Inc., Electronic Water Purifier, *Electronic Water Purification For basic TDS reduction in Water and Waste Water*, Robert Atlas, pp. 1–3; found at www.sabrex-tx.com/report2.htm on Jun. 15, 2000.

Sabrex of Texas, Inc., Electronic Water Purifier, *Inventor Builds Device in Cellar to Clean Water*, Peter P. Donker Telegram & Gazette Staff, Aug. 8, 1999, pp. 1–3, found at www.sabrex-tx.com/newsarticle1.htm on Jun. 15, 2000.

Sabrex of Texas, Inc., Electronic Water Purifier, *Equipment inventor wins Army contract*, Water Tech News Daily, Aug. 12, 1999; found at www.sabrex-tx.com/newsarticle2.htm on Jun. 15, 2000.

Biosource, Inc., *Flow–Through Capacitor*, 2 pages; found at www.flowtc.com/drg_home.html on Jun. 15, 2000.

*Technical Documentation for the Flow–Through Capacitor*, pp. 1–4; found at www.flowtc.com/drg_tech.html on Jun. 15, 2000.

Sabrex of Texas, Inc., Electronic Water Purifier, *Removal of Chrome and creating a Zero Discharge System Using Electronic Water Purification*, Robert Atlas, pp. 1–8; found at www.sabrex-tx.com/report1.htm on Jun. 15, 2000.

* cited by examiner

WATER TREATMENT SYSTEM AND WATER HEATER WITH CATHODIC PROTECTION AND METHOD

FIELD OF THE INVENTION

The present invention relates to water heating and water treatment to remove impurities. More particularly, this invention relates to on-premise water heating and water treatment in a post-mix beverage dispenser.

BACKGROUND OF THE INVENTION

Water heaters are used every day in many applications. One use of water heaters is in water treatment systems wherein water containing impurities, such as excessive bicarbonate hardness, is heat-treated and filtered. Heating the water causes impurities such as bicarbonates to precipitate as solids which can be removed by filtration. However, while the heater is heating the water, calcium carbonate precipitates and deposits on the metal heating elements of the water heater and forms an insulating layer which quickly decreases the thermal conductivity and efficiency of the heating element.

Calcium carbonate deposits on metal heating elements form when a high pH of about 8.5 develops proximate the metal surface of the heating element. At this high pH, the calcium ions and carbonate ions precipitate to form solid aragonite or calcite on the metal heating element surface.

Chemical solutions have been used to overcome the problem of calcium carbonate deposits on water heater heating elements. For example, chemical solutions can decrease the hardness of water by decreasing the calcium ion concentration of the carbonate ion concentration in the water.

One use of water treatment systems is in on-premise beverage preparation (generally referred to post-mix equipment). In locations where local water supply is a health issue, on-premise water treatment is a necessity. Reliable and inexpensive water treatment systems for on-premise beverage production are desirable, but the use of chemical solutions to address the problem in beverage production is a concern. Therefore, there is a need for reducing calcium carbonate deposits on water heating elements without the use of chemical solutions, particularly in on-premise beverage production.

SUMMARY OF THE INVENTION

This invention fulfills the above-described need by providing a water heater comprising a housing, at least a portion of which is metallic, and a metallic heating element disposed in the housing, the metallic portion of the housing and the metallic heating element being electrically connected such that the metallic portion of the housing functions as a cathode and the metallic heating element functions as an anode. More particularly, the housing defines a water heating chamber and has a water inlet for receiving water and a water outlet for discharging water. The metallic heating element is disposed in the housing for heating the water. During operation, the metallic portion of the housing is cathodic and the metallic heating element is anodic and current flows from the metallic heating element, through the water, to the metallic portion of the housing. The current entering the metal structure of the heating element lowers its surface potential and brings the metal into a thermodynamic immunity region.

An electrochemical exchange occurs between the cathodic metallic portion of the housing and the anodic metallic heating element and produces $H^+$ ions proximate the surface of the anodic metallic heating element and $OH^-$ ions proximate the surface of the cathodic metallic portion of the housing. Therefore, a low pH develops proximate the surface of the anodic metallic heating element and a high pH develops proximate the surface of the cathodic metallic portion of the housing. Because calcium carbonate only precipitates at a high pH, calcium carbonate in the water does not precipitate onto the anodic metallic heating element, but rather precipitates on the cathodic metallic portion of the housing. In addition, although the metallic heating element corrodes in the electrolytic reaction, the metallic heating element can be made of a metal having a low rate of electrochemical consumption. Furthermore, the metallic portion of the housing does not corrode and can be made of a less expensive metal which would otherwise corrode. Because the solid precipitates do not form on the metallic heating element of the water heater of this invention, the metallic heating element maintains its thermal conductivity and efficiency and the water heater is more efficient, reliable, and inexpensive.

This invention also encompasses a water treatment system comprising the above-described water heater and a collector disposed in the housing for collecting solid precipitates deposited from the water in a water treatment chamber defined by the water heater housing.

According to one embodiment, the metallic portion of the housing and the metallic heating element are electrically connected with a rectifier or a direct current voltage source which forces the metallic portion of the housing to function as a cathode and the metallic heating element to function as an anode. In this one embodiment, the metallic portion of the housing and the metallic heating element are insulated from direct electrical contact with one_another. The electrical connection is through the rectifier or direct current voltage source. Alternatively, the metallic portion of the housing and a metallic heating element can be made of metals having different surface potentials so that the metallic portion of the housing and the metallic heating element, along with the water in the water treatment chamber, function as an electrochemical cell.

The metallic portion of the housing can be a part of the container body of the housing or can be a metallic electrode extending from the container body into the water treatment chamber. The metallic portion of the housing, which functions as a cathode, is in direct contact with water in the water treatment chamber. Furthermore, the housing can comprise a first container defining the water treatment chamber and a second container comprising the metallic heating element, the metallic heating element being a heat exchanger tube. In one embodiment, the first container includes a first heating element and the second container includes a second heating element, which is a heat exchanger tube. Both the first and second heating elements can be arranged with cathodic protection.

In addition, this invention encompasses a method for heating water comprising feeding water into a water heating chamber defined by a housing through a water inlet in the housing, heating the water fed into the water heating chamber with a metallic heating element, and flowing current from the metallic heating element, through the water, to the metallic portion of the housing, wherein at least a portion of the housing is metallic and the metallic portion of the housing and the metallic element are electrically connected such that the metallic portion of the housing is cathodic and the metallic heating element is anodic.

In addition, this invention encompasses a method for treating water comprising feeding untreated water into a water treatment chamber defined by a housing through a water inlet in the housing, heating the untreated water fed into the water treatment chamber with a metallic heating element to convert dissolved impurities in the untreated water to solid precipitates, collecting the solid precipitates deposited from the water onto a collector disposed in the housing and flowing current from the metallic heating element, through the water, to the metallic portion of the housing, wherein at least a portion of the housing is metallic and the metallic portion of the housing and the metallic heating element are electrically connected such that the metallic portion of the housing is cathodic and the metallic heating element is anodic.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

DETAILED DESCRIPTION OF THE PREFERRED EMBODIMENTS

As summarized above, this invention encompasses a water heater and method for heating water wherein a heating element is protected from precipitation of solids. Without precipitation of solids, such as calcium carbonate, on the surface of the heating element, the heating element transfers heat efficiently and effectively. Solid precipitates, such as calcium carbonate deposits, would otherwise lower the thermal conductivity and the efficiency of the heating element drastically. This invention also encompasses water treatment systems and methods including the water heater of this invention. Solid precipitates are a particular problem in water treatment systems designed to remove such impurities. Water treatment systems made in accordance with embodiments of this invention are described below.

Figure 1:
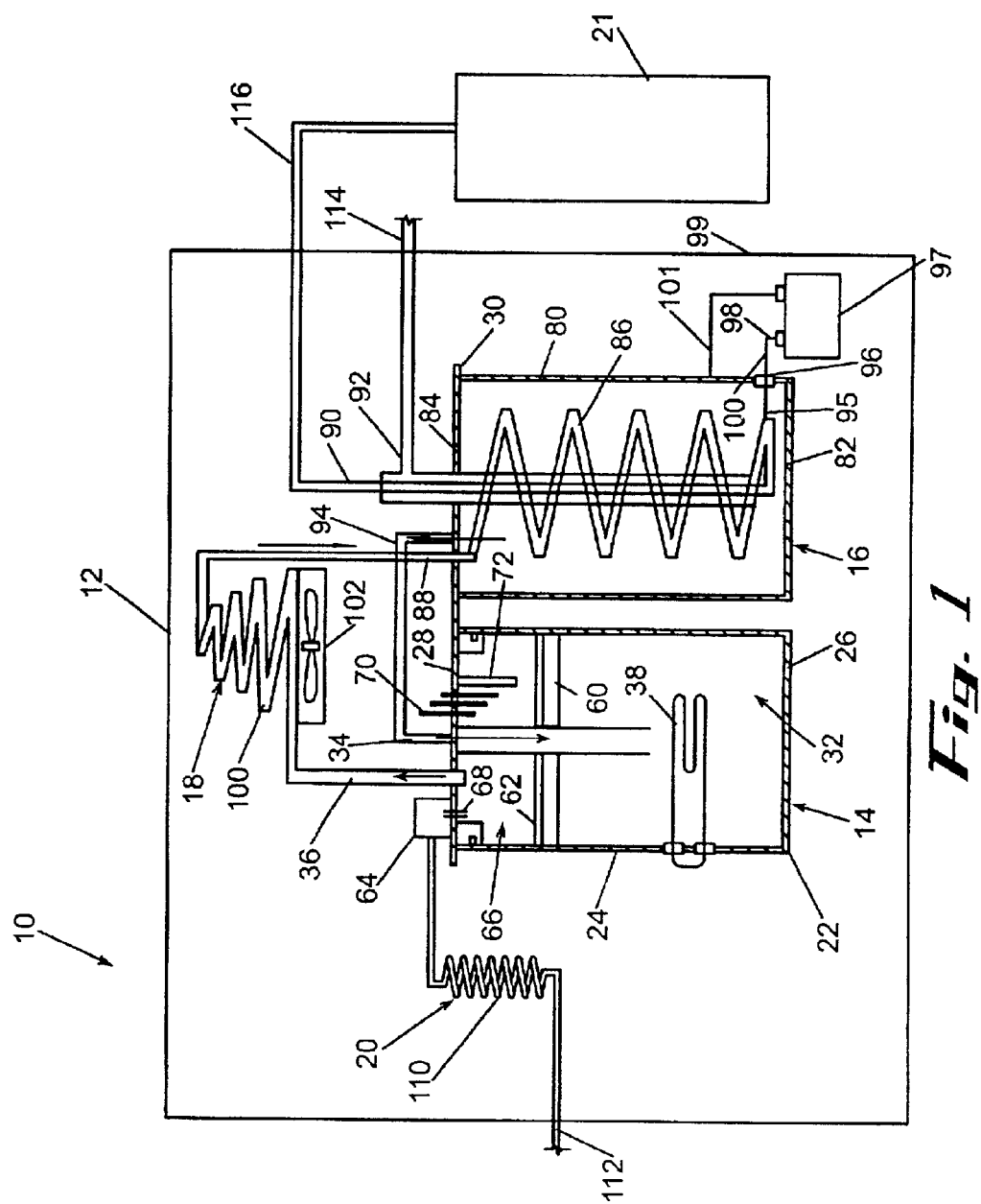
FIG. 1 is a schematic illustration of a water treatment system made in accordance with an embodiment of this invention.

Referring in detail to the drawings in which like reference numerals illustrate like components throughout the views, FIG. 1 shows a water treatment system 1 made in accordance with an embodiment of this invention. Generally, the water treatment system 10 comprises an enclosure 12, a disposable and replaceable water treatment cartridge 14, a heat exchange cartridge 16, an intercooler 18, a condenser 20, and a treated water reservoir 21. The water treatment cartridge 14 and the heat exchanger cartridge 16 form a system housing through which water flows for treatment to remove impurities.

The enclosure 12 is desirably of sturdy construction such as stainless steel, plastic, wood or other types of metal, and has an access opening which can be sealed by a door (not shown). Vents in the enclosure allow cooling air flow through the enclosure.

The water treatment cartridge 14 shown in FIG. 1 comprises a water treatment housing 22 including a container body 24. The container body 24 comprises a metal cylinder or can 26 which removably attaches to a circular head 28 attached to a mounting panel 30 in the enclosure 112. The water treatment housing 22 defines a water treatment chamber 32. An untreated water inlet 34 extends through the head 28 of the water treatment housing 22 and into the water treatment chamber 32. The untreated water inlet 34 discharges untreated water toward the lower end of the water treatment housing 22. A treated water outlet 36 extends from within the water treatment chamber 32 through the head 28 of the cartridge housing 22.

A water submersible, metallic electric heating element 38 is disposed in the cartridge housing 22 through the metal cylinder 26. The heating element 38 is disposed in the water treatment housing 22 for direct contact with water in the housing and is disposable along with the remainder of the water treatment cartridge 14. The heating element 38 is operable for heating water in the water treatment chamber 32 of the cartridge 14 sufficiently to convert dissolved impurities in the untreated water to solid precipitates and gases.

A collector 60 comprising a steel or plastic mesh is disposed in the water treatment housing 22 between the heating element 38 and the head 28. The collector 60 collects at least a portion of the solid precipitates deposited from the water during treatment of the water. A polishing filter 62 is disposed in the water treatment housing 22 on top of the collector 60 and collects the relatively fine portion of the precipitates deposited from the water during treatment. The polishing filter 62 can comprise a variety of materials, but preferably comprises polyester wool.

A gas outlet valve 64 in the head 28 of the water treatment housing 22 periodically discharges gases from the head space 66 of the cartridge 14 through a gas outlet 68. These gases include steam, carbon dioxide, and other impurities released from the water during treatment.

Water level sensors 70 disposed in the water treatment cartridge housing 22 above the polishing filter 62 indicate the water level in the water treatment cartridge 14. A temperature measuring device 72, such as a thermocouple, disposed in the water treatment chamber 32 of the water treatment housing 22 measures the temperature of the water in the water treatment chamber. Alternatively, the temperature measuring device 72 can be attached to the outside of the water treatment housing.$_{13}$A steam detector (not shown), such as a thermal switch, disposed in the gas outlet 68 detects the generation of steam by the water treatment cartridge 14.

The heat exchange cartridge 16 is disposed in the water treatment enclosure 12 adjacent the water treatment cartridge 14 and comprises a heat exchange housing 80 including a metal cylinder or can 82 and a head 84. The cylinder 82 removably attaches to the head 84. The heat exchange cartridge 16 also includes a coiled tube 86 for receiving treated water from the water treatment cartridge 14. The coiled tube 86 extends between a treated water inlet 88 extending through the head 84 of the heat exchange housing 80 and a treated water outlet 90, which extends through the head 84 of the heat exchange housing inside an untreated water inlet 92. Untreated water enters the heat exchange cartridge housing 80 through the untreated water inlet 88 in the head 84. The untreated water inlet 92 discharges the untreated water near the bottom of the heat exchange cartridge housing 80. An untreated water outlet 94 also extends through the head 84 of the heat exchange cartridge housing 80 and connects with the untreated water inlet 92 of the water treatment cartridge 14.

An electrical contact 95 extends through the metal cylinder 82 of the heat exchange housing 80 through insulated packing 96 for connecting the coiled heating tube 86 to a direct current electric power source 97. The direct current voltage source 97 has a positive terminal 98 and a negative terminal 99. The positive terminal 98 connects to the coiled heating tube 86 via a wire 100 and the negative terminal 99 connects to the metal cylinder 82 of the cartridge housing 80 via another wire 101. The metal cylinder 82 of the heat exchange housing 80 and the coiled heating tube 86 are thereby electrically connected through the direct current voltage source 97 such that the metal cylinder of the heat exchange housing is cathodic and the coiled heating tube is anodic. Otherwise, the metal cylinder 82 and the coiled heating tube 86 are electrically insulated from one another such as with the insulated packing 96. As will be explained below in more detail during the description of the operation of the water treatment system 10, electric current flows from the coiled heating tube 86 through the somewhat electrolytic water in the heat exchange housing 80, to the metal cylinder 82 of the heat exchange housing. This flow of current, as will be explained more below, provides cathodic protection for the coiled heating tube 86 of the heat exchanger cartridge 16.

Desirably, the metal of the coiled heating tube 86 corrodes slowly electrochemically. Suitable materials for making the coiled heating tube include all materials that are functional as an anode in cathodic protection. When an external power supply is used, suitable metals for making the coiled heating tube 86 include "noble" materials that do not corrode much under anodic polarization. They can be classified in three categories depending on their corrosion rates. Particularly desirable materials include carbon steel, silicon cast iron, silicon cast chromium iron, graphite, or carbon. Such materials corrode with a speed of kg/A year. Of course, alloys of such materials are also suitable. Carbon is a good candidate even if its corrosion rate is high because the preferable product of electrochemical reactions is $CO_2$ which produces a very low pH at the anode surface (no calcium precipitations at low current densities will occur). Even more desirable materials include magnetite, ferrite and their alloys. They corrode with a speed in the order of g/A year. Still more desirably, suitable materials include titanium or niobium substrate with a platinum layer or the material known as Mix Metal Oxides (MMO). All of these materials can be loaded in powder form in a polymer matrix. For example, the extrinsic conductive polymer could be moulded on an existing stainless steel coil.

Any metal is suitable for making the metal cylinder 82 of the heat exchanger housing 80. Because the metal cylinder 82 of the heat exchange housing 80 functions as a cathode in this electrochemical arrangement, the metal cylinder does not corrode and can be made of inexpensive metals which would otherwise corrode.

The intercooler 18 is disposed in the enclosure 12 and includes a coiled tube 100 connected to the treated water outlet 36 of the water treatment cartridge 14. A fan 104 disposed in the enclosure 12 forces air flow through vents in the enclosure.

The condenser 20 is also disposed in the enclosure 12 and comprises tubing 110 extending from the gas outlet 68 in the water treatment cartridge 14 to an outlet 112 in the enclosure 12.

Raw untreated water is introduced into the water treatment system 10 via a water main 114 which leads to the untreated water inlet 92 of the heat exchange cartridge 16. Cooled treated water from the heat exchange cartridge 16 is discharged to the reservoir 21 via an exit conduit 116.

To begin operation of the water treatment system 10, raw untreated water enters the water treatment system through the water main 114 and discharges through the untreated water inlet 92 of the heat exchange cartridge 16 into the housing 80 of the heat exchange cartridge proximate the bottom of the heat exchange cartridge housing. The heat exchange cartridge 16 heats the untreated water from a temperature of about 25° C. to about 80° C. The heat exchange cartridge 116 discharges the heated untreated water through the untreated water outlet 94 which connects to the untreated water inlet 34 of the water treatment cartridge 14.

The untreated water inlet 34 of the water treatment cartridge 14 introduces the heated untreated water into the water treatment cartridge housing 22 below the steel mesh collector 60 in the water treatment cartridge housing. The heating element 38 in the water treatment chamber 32 heats the untreated water to a temperature of about 115° C. The water slowly flows up to the top of the water treatment cartridge 14 through the collector 60 and the polishing filter 62. The minimum residence time of water in the water treatment cartridge 14 is about six minutes. Heating the water causes precipitates such as carbonates and heavy metals to deposit on the heated surfaces of the water treatment cartridge. The coarser, heavier particles tend to settle at the bottom of the water treatment housing 22 and finer particles collect on the collector 60 and the polishing filter 62. In addition, as the water in the water treatment cartridge 14 heats, entrained gases are released from the water into the head space 66 of the cartridge and steam forms in the head space of the cartridge. When the temperature of the water in the water treatment cartridge 14 reaches 115° C., a valve in the gas outlet opens and releases steam and other gases to the condenser 20.

Gases in the condenser 20, such as steam, are cooled in the condenser by the forced air flow in the enclosure 12 created by the fan 182. The condensants are discharged into a drip pan (not shown) or directly to drain.

The treated water outlet 36 discharges treated water from the water treatment cartridge housing 22 to the intercooler 18. Forced air produced by the fan 104 in the enclosure 12 cools the treated water in the intercooler 18 from a temperature of about 115° C. to about 80° C. The intercooler 18 discharges the treated water into the coiled tube 86 of the heat exchange cartridge 16 through the treated water inlet 88. The treated water travels through the inside of the coiled tube 86 and the counter-flowing untreated water from the water main 114 cools the treated water from a temperature of about 80 C. to about the temperature of the incoming untreated water from the water main.

The treated water outlet 90 discharges the cooled treated water from the heat exchange cartridge 16 to the reservoir 21. The reservoir 21 holds the treated water until the treated water is dispensed, such as for use in making fountain beverages.

The purpose of the intercooler 18 is to cool the treated water to a temperature sufficiently low so as not to cause hardness in the untreated water passing through the heat exchanger to precipitate and form scale in the heat exchange cartridge 16 and the conduits feeding the untreated water from the heat exchange cartridge to the water treatment cartridge 14.

The water being treated in the water treatment system 10 comprises ions such as calcium and carbonate ions. The water is therefore somewhat electrolytic. By connecting the metal cylinder 82 of the heat exchange housing 80 and the coiled heating tube 86 to the DC voltage source 97 such that the metal cylinder functions as a cathode and the coiled heating tube functions as an anode, electric current flows from the coiled heating tube, through the water in the heat exchanger cartridge 16, to the metal cylinder of the heat exchange 80. This flow of current creates an electrochemical exchange through the water between the cathodic metal cylinder 82 of the heat exchange housing 80 and the coiled heating tube 86. In the electrochemical exchange, $H^+$ ions are produced proximate the surface of the coiled heating tube 86 and $OH^-$ ions are produced proximate the surface of the metal cylinder 82. Accordingly, independently of the pH of the water in the heat exchanger cartridge 16, the electrochemical exchange creates a low pH proximate the surface of the coiled heating tube 86 and a high pH proximate the surface of the metal cylinder 82 of the heat exchange housing 80. Calcium carbonate precipitates from water at a high pH, but not a low pH. Therefore, calcium carbonate does not precipitate onto the coiled heating tube 86 due to the low pH proximate the surface of the heating element. Instead, the calcium carbonate tends to precipitate on the surface of the metal cylinder 82 of the heat exchange housing 80. Because the calcium carbonate does not precipitate on the coiled heating tube 86, the coiled tube remains clean and its thermal conductivity in the water remains high. This effect maintains the efficiency of the heat exchanger cartridge 16 longer than without the electrochemical exchange. Without the electrochemical exchange, calcium carbonate would build up on the surface of the coiled heating tube 86 and insulate the coiled tube from the water.

Due to the electrochemical exchange, the coiled heating tube 86 will slowly corrode, but by choosing the appropriate metal as described above, the corrosion can be sufficiently slow so as not to be the life limiting component of the heat exchanger cartridge 16. The electrochemical exchange, on the other hand, prevents corrosion of the metal cylinder 82 of the housing 80. As a result, this container can be made from an inexpensive metal which would otherwise corrode.

The same electrochemical effect achieved with the heat exchanger cartridge 16 can be achieved alternatively by choosing metals having different surface potentials in the same electrolyte for the coiled heating tube 86 and the metallic portion of the heat exchange housing 80. By connecting these two metal components electrically, such as by a wire, the metallic portion of the heat exchange housing 80 and the coiled heating tube 86 function as an electrochemical cell when the heat exchanger cartridge 16 is filled with water.

Figure 2:
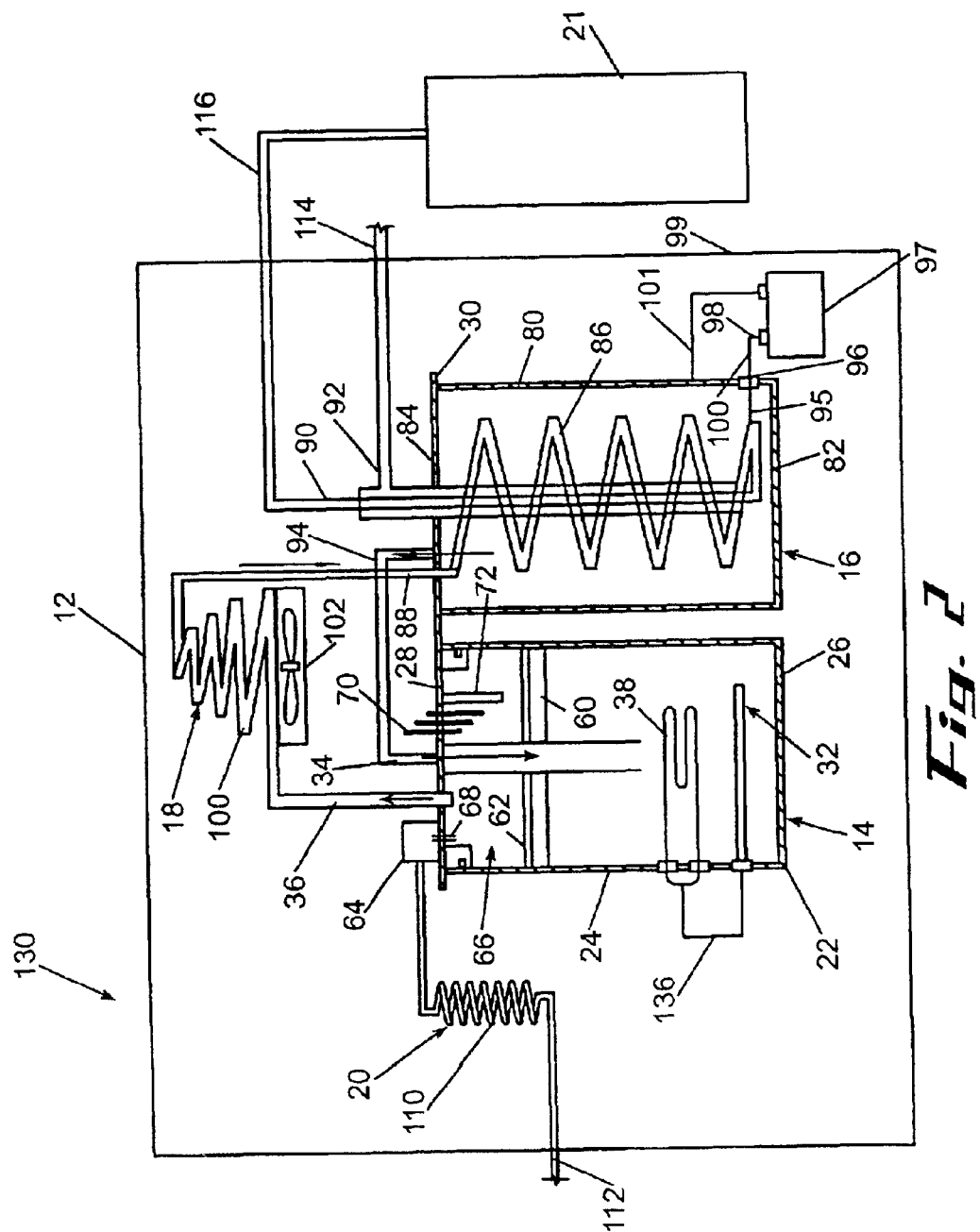
FIG. 2 is a partial schematic illustration of a water treatment system made in accordance with an alternative embodiment of this invention.

FIG. 2 illustrates schematically an alternative water treatment cartridge 130 having the same components as the previously described embodiment 10 illustrated in FIG. 1, but also includes cathodic protection. In addition, this alternative water treatment cartridge 130 comprises a metallic electrode 132 which extends from the container body 24 of the water treatment housing 22 into the water treatment chamber 32. A wire 136 connects the metal heating element 38 to the metallic electrode 132. The metallic electrode 132 is spaced from the metal heating element 138 within the water treatment chamber 32. The metallic electrode 132 is suitably made from a more noble metal and the metal heating element is suitably made from a less noble metal so that the metallic electrode and the metal heating element having different surface potentials and produce an electrical current in the water treating chamber 32. The metallic electrode 132 functions as a cathode and the heating element 38 functions as an anode such that electric current flows from the metal heating element 38, through the water treatment chamber 32, to the metallic electrode 132. This produces the same electrochemical exchange and effect as described with regard to the heat exchanger cartridge 16 illustrated in FIG. 1. The heat exchanger cartridge 16 can be arranged with cathodic protection in the same manner as is the water treatment cartridge 14 in FIG. 2.

Suitable metals for making the metal heating element 38 when the current is generated by the difference of potential between materials ("galvanic case"), the material must have a low potential or a high tendency to corrode. The materials that are normally used as anode in galvanic protection are: Zinc (Zn), Aluminum (Al—In) and Magnesium (Mg). They are classified in galvanic efficiency as 95% for Zn; 80% for Al—In and 50% for Mg. Galvanic efficiency means ratio of the practical consumption rate to density (Faraday law of consumption).

Although the foregoing embodiments are described as water treatment systems, the cathodic protection of this invention can be applied to any water heater wherein the heating element is in direct contact with water.

The water treatment system and method of the this invention require little control, are simple to maintain and operate and are relatively inexpensive. In particular, the disposable cartridges 14 and 16 are relatively simple and the non-disposable contents of the apparatus require little maintenance. Therefore, this system can economically treat water without entailing high capital expenditures.

The present water treatment system and method reduce water hardness and provide sterile water while removing many impurities of the water. A simple method for in-home or in-store removal of microbiological contaminants, bicarbonate hardness, VOCs/THMs, chlorine, heavy metals and deaeration of water is provided. High reliability in the absence of technical monitoring or controls is obtained. This system and method are simple, convenient and can safely be operated by non-qualified personnel. Moreover, this apparatus and method require only limited space thereby further reducing the overall cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system for treating water comprising:
a housing having a water inlet for receiving untreated water and a water outlet for discharging treated water, wherein the housing, at least a portion of which is metallic, comprises
a first container defining a water treatment chamber comprising an electric heating element, and
a second container comprising a metallic heat exchanger tube,
wherein the electric heating element and the metallic heat exchanger tube are capable of heating the water sufficiently to convert dissolved impurities in the untreated water to solid precipitates; and
a collector disposed in the housing for collecting the solid precipitates deposited from the water;
wherein the metallic portion of the housing and the metallic heat exchanger tube are electrically connected such that the metallic portion of the housing is cathodic and the metallic heat exchanger tube is anodic due to electrochemical exchange through the water between the metallic portion of the housing and the metallic heat exchanger tube.

2. The system of claim 1, wherein the metallic portion of the housing and the metallic heat exchanger tube are electrically connected with a direct current voltage source.

3. The system of claim 1, wherein the metallic portion of the housing and the metallic heat exchanger tube have different surface potentials.

4. The system of claim 1, wherein the second container is the metallic portion of the housing.

5. The system of claim 1, wherein metallic heat exchanger tube comprises a metal selected from the group consisting of carbon steel, silicon cast iron, silicon cast chromium iron, graphite, and carbon.

6. The system of claim 1, wherein metallic heat exchanger tube comprises a metal selected from the group consisting of magnetite, ferrite, and alloys thereof.

7. The system of claim 1, wherein metallic heat exchanger tube comprises a metal selected from the group consisting platinum and Mix Metal Oxides.

8. The system of claim 1, wherein the electric heating element comprises a metallic surface within the water treatment chamber.

9. The system of claim 8, wherein first container further comprises a metallic electrode in a position spaced from the electric heating element within the water treatment chamber.

10. The system of claim 9, wherein the metallic electrode and the metallic surface of the electric heating element have different surface potentials.

11. The system of claim 9, wherein the metallic electrode and the metallic surface of the electric heating element are electrically connected such that the metallic electrode is cathodic and the metallic surface of the electric heating element is anodic due to electrochemical exchange through the water between the metallic electrode and the metallic surface of the electric heating element.

12. A method for treating water comprising:
feeding untreated water into a housing through a water inlet in the housing, the housing comprising a first container which defines a water treatment chamber and which comprises an electric heating element, and a second container which comprises a metallic heat exchanger tube, wherein at least a portion of the second container is metallic;
heating the untreated water fed into the housing with the electric heating element and the metallic heat exchanger tube to convert dissolved impurities in the untreated water to solid precipitates;
electrically connecting the metallic portion of the second container and the metallic heat exchanger tube through the water such that the metallic portion of the second container is cathodic and the metallic heat exchanger tube is anodic; and
collecting the solid precipitates deposited from the water onto a collector disposed in the housing.

13. The method of claim 12, wherein the metallic portion of the second container and the metallic heat exchanger tube are electrically connected with a direct current voltage source.

14. The method of claim 12, wherein the metallic portion of the second container and the metallic heat exchanger tube have different surface potentials.

15. The method of claim 12, wherein metallic heat exchanger tube comprises a metal selected from the group consisting of carbon steel, silicon cast iron, silicon cast chromium iron, graphite, and carbon.

16. The method of claim 12, wherein metallic heat exchanger tube comprises a metal selected from the group consisting of magnetite, ferrite, and alloys thereof.

17. The method of claim 12, wherein metallic heat exchanger tube comprises a metal selected from the group consisting platinum and Mix Metal Oxides.

18. The method of claim 12, wherein the electric heating element comprises a metallic surface within the water treatment chamber.

19. The method of claim 18, wherein first container further comprises a metallic electrode in a position spaced from the electric heating element within the water treatment chamber.

20. The method of claim 19, wherein the metallic electrode and the metallic surface of the electric heating element have different surface potentials.

21. The method of claim 19, wherein the metallic electrode and the metallic surface of the electric heating element are electrically connected such that the metallic electrode is cathodic and the metallic surface of the electric heating element is anodic due to electrochemical exchange through the water between the metallic electrode and the metallic surface of the electric heating element.

22. The method of claim 12, wherein the untreated water fed into the housing flows first through the second container exterior of the heating tube, through the first container, and then following removal of the solid precipitates the treated water flows back into the second container interior the heating tube.

23. A system for treating water comprising:
a housing having a water inlet for receiving untreated water and a water outlet for discharging treated water, wherein the housing, at least a portion of which is metallic, comprises
a first container defining a water treatment chamber comprising (i) an electric heating element having a metallic surface, and (ii) a metallic electrode in a position spaced from the electric heating element within the water treatment chamber, and
a second container comprising a metallic heat exchanger tube,
wherein the electric heating element and the metallic heat exchanger tube are capable of heating the water sufficiently to convert dissolved impurities in the untreated water to solid precipitates; and
a collector disposed in the housing for collecting the solid precipitates deposited from the water;
wherein the metallic portion of the housing and the metallic heat exchanger tube are electrically connected such that the metallic portion of the housing is cathodic and the metallic heat exchanger tube is anodic due to electrochemical exchange through the water between the metallic portion of the housing and the metallic heat exchanger tube, and wherein the metallic electrode and the metallic surface of the electric heating element are electrically connected such that the metallic electrode is cathodic and the metallic surface of the electric heating element is anodic due to electrochemical exchange through the water between the metallic electrode and the metallic surface of the electric heating element.

* * * * *